United States Patent
Niwa et al.

(10) Patent No.: US 10,436,098 B2
(45) Date of Patent: Oct. 8, 2019

(54) ENGINE EQUIPPED WITH TURBO SUPERCHARGER

(71) Applicant: MAZDA MOTOR CORPORATION, Hiroshima (JP)

(72) Inventors: Yasushi Niwa, Higashihiroshima (JP); Hiroshi Sumimoto, Aki-gun (JP); Kazuya Niida, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 56 days.

(21) Appl. No.: 15/759,601

(22) PCT Filed: Feb. 28, 2017

(86) PCT No.: PCT/JP2017/007956
§ 371 (c)(1),
(2) Date: Mar. 13, 2018

(87) PCT Pub. No.: WO2017/159357
PCT Pub. Date: Sep. 21, 2017

(65) Prior Publication Data
US 2019/0040787 A1 Feb. 7, 2019

(30) Foreign Application Priority Data
Mar. 14, 2016 (JP) .................. 2016-049905

(51) Int. Cl.
*F01N 13/10* (2010.01)
*F02B 77/11* (2006.01)
(Continued)

(52) U.S. Cl.
CPC ........... *F01N 13/102* (2013.01); *F01N 13/10* (2013.01); *F01N 13/141* (2013.01); *F02B 37/02* (2013.01);
(Continued)

(58) Field of Classification Search
CPC ...... F01N 13/10; F01N 13/102; F01N 13/141; F01N 2260/20; F02B 37/02; F02B 67/10; F02B 77/11; F02B 37/004
See application file for complete search history.

(56) References Cited

U.S. PATENT DOCUMENTS

| 4,183,994 A | 1/1980 | Tsubaki |
| 7,234,302 B2 * | 6/2007 | Korner ................... F01D 9/026 285/41 |

(Continued)

FOREIGN PATENT DOCUMENTS

| EP | 2354490 A1 | 8/2011 |
| FR | 2998617 A1 | 5/2014 |

(Continued)

OTHER PUBLICATIONS

International Search Report issued in PCT/JP2017/007956; dated Apr. 25, 2017.

(Continued)

Primary Examiner — Brandon D Lee
(74) Attorney, Agent, or Firm — Studebaker & Brackett PC

(57) ABSTRACT

An engine equipped with a turbo supercharger has an exhaust manifold coupled to an engine body, a turbo supercharger including a turbine housing demarcating a turbine chamber and a supply path of exhaust air, and a turbine insulator covering the same, and a manifold insulator covering at least the upper surface of the exhaust manifold and the side surface of the exhaust manifold on the turbo supercharger side. The exhaust manifold has a flange as a connection section with respect to the turbo supercharger. The manifold insulator has a cut-away section exposing a joining surface of the flange, and an opening caused by having the interval between the cut-away edge of the cut- (Continued)

away section and the outer peripheral edge of the flange be relatively wider in a predetermined position than in other positions.

12 Claims, 14 Drawing Sheets

(51) Int. Cl.
*F01N 13/14* (2010.01)
*F02B 67/10* (2006.01)
*F02B 37/02* (2006.01)
*F02B 37/00* (2006.01)

(52) U.S. Cl.
CPC .............. *F02B 67/10* (2013.01); *F02B 77/11* (2013.01); *F01N 2260/20* (2013.01); *F02B 37/004* (2013.01)

(56) References Cited

U.S. PATENT DOCUMENTS

| 2012/0023928 A1 | 2/2012 | Smatloch et al. |
| 2012/0235407 A1 | 9/2012 | Blackie et al. |

FOREIGN PATENT DOCUMENTS

| JP | S54-024356 A | 2/1979 |
| JP | 2005-201093 A | 7/2005 |
| JP | 2013-050068 A | 3/2013 |
| JP | 2013-076352 A | 4/2013 |

OTHER PUBLICATIONS

The extended European search report issued by the European Patent Office dated Dec. 7, 2018, which corresponds to European Patent Application No. 17766360.6 and is related to U.S. Appl. No. 15/759,601.

* cited by examiner

FIG. 4
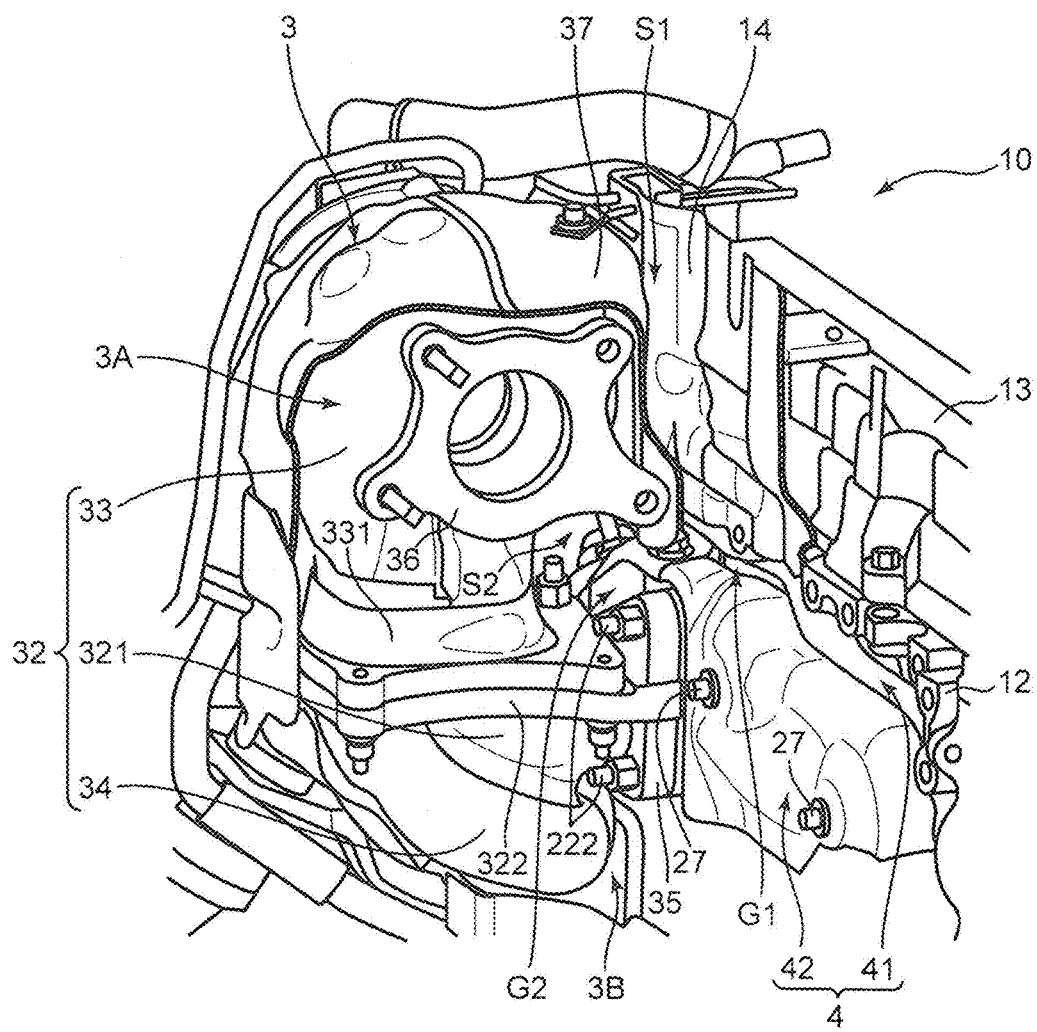
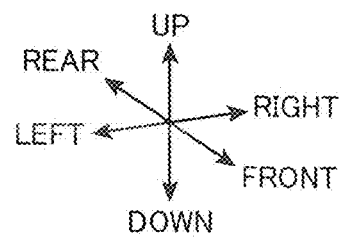

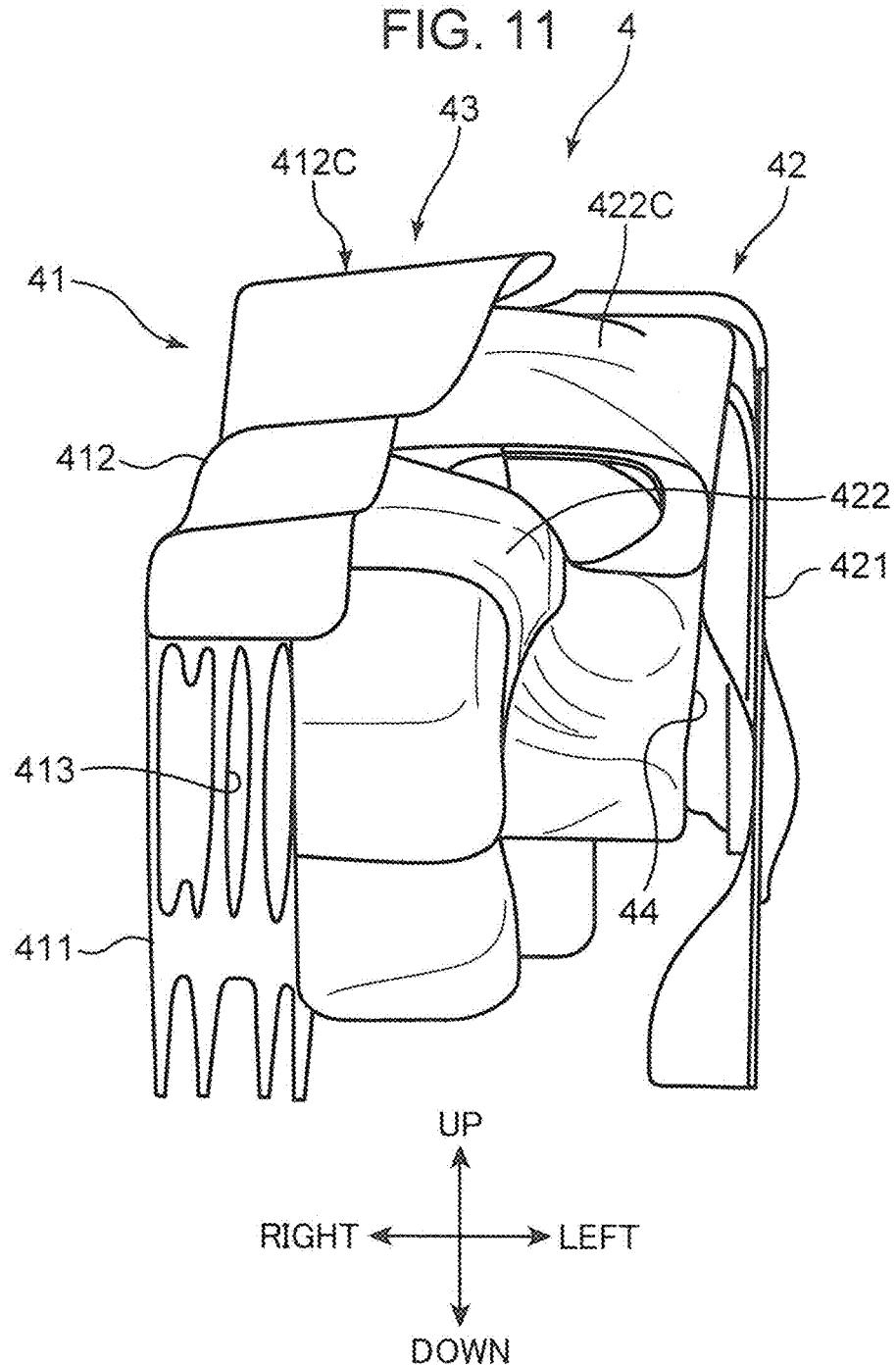

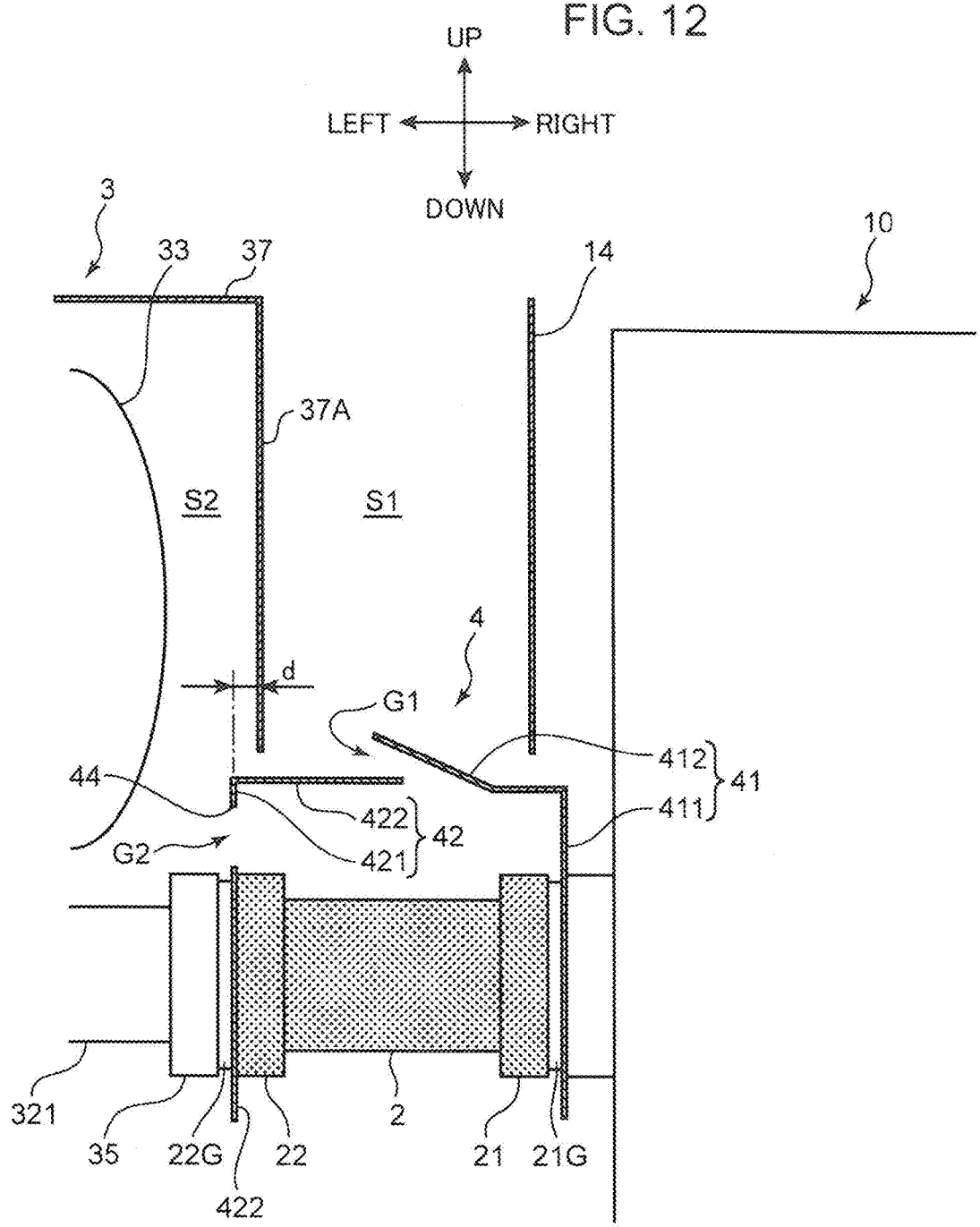

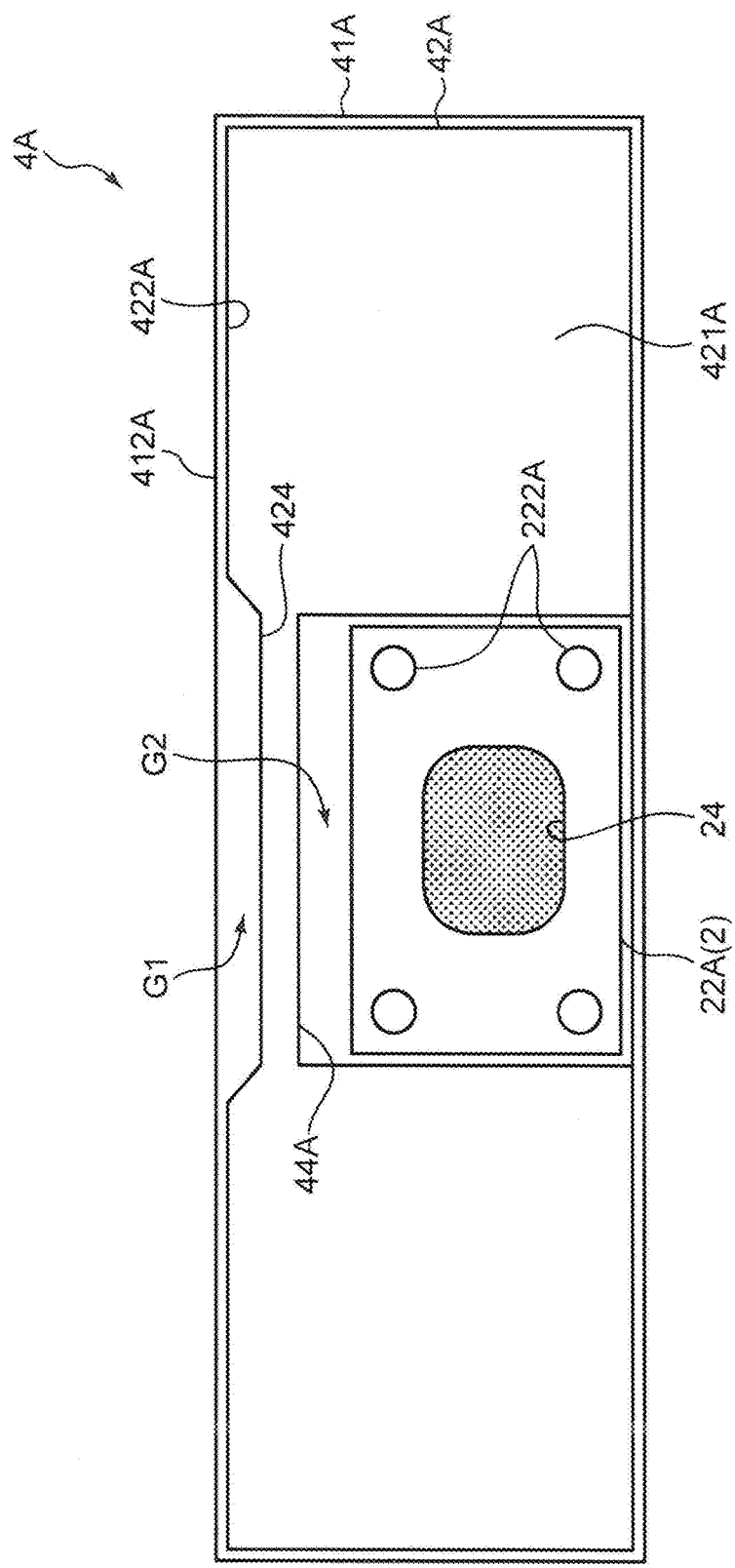

ENGINE EQUIPPED WITH TURBO SUPERCHARGER

TECHNICAL FIELD

The present invention relates to an engine equipped with a turbo supercharger in which the turbo supercharger is disposed on a multi-cylinder engine body to which an exhaust manifold is coupled.

BACKGROUND ART

An exhaust manifold is coupled to a multi-cylinder engine body. The intake side of the exhaust manifold is connected to an exhaust port of a cylinder head, and the exhaust side of the exhaust manifold is connected to an exhaust path having a catalytic device. In an engine equipped with a turbo supercharger, the exhaust energy of the engine is used. In this case, the exhaust side of the exhaust manifold is connected to a turbine chamber of the turbo supercharger.

The exhaust manifold becomes hot at the time of driving the engine, which may thermally affect peripheral components. For example, a cylinder head cover mounted on the upper side of the cylinder head may be made of a resin material for weight reduction, and is thus likely to be thermally affected. Therefore, for heat insulation, the periphery of the exhaust manifold is covered by a heat insulator (manifold insulator). Patent Literature 1 discloses a heat insulation configuration in which an extension section is disposed at the upper ends of gaskets interposed between the connection sections of a cylinder head and an exhaust manifold, the extension section covering the upper side of the exhaust manifold.

Even when the manifold insulator covers the exhaust manifold, hot air cannot be completely confined in the insulator. The hot air in the manifold insulator may leak out from an unexpected gap to cause thermal damage to the peripheral components. Also in the heat insulation configuration disclosed in Patent Literature 1, it is not disclosed about how the hot air in the insulator should be released.

CITATION LIST

Patent Literature

Patent Literature 1: Japanese Patent Application Laid-Open No. 2013-076352

SUMMARY OF INVENTION

An object of the present invention is to provide an engine equipped with a turbo supercharger, the engine capable of releasing hot air in an insulator without causing thermal damage to peripheral components.

An engine equipped with a turbo supercharger according to one aspect of the present invention has a multi-cylinder engine body, an exhaust manifold coupled to the engine body, a turbo supercharger including a turbine chamber to which exhaust air is supplied from the exhaust manifold, a turbine housing demarcating the turbine chamber and a supply path of the exhaust air, and a turbine insulator covering the turbine housing, and a manifold insulator covering at least the upper surface of the exhaust manifold and the side surface of the exhaust manifold on the turbo supercharger side.

The exhaust manifold has a flange having the communication opening of an exhaust path with respect to the turbo supercharger and joined to the turbine housing. The manifold insulator has a cut-away section exposing a joining surface of the flange, and an opening caused by having the interval between the cut-away edge of the cut-away section and the outer peripheral edge of the flange be relatively wider in a predetermined position than in other positions. The opening is opened toward a space between the turbine housing and the turbine insulator.

BRIEF DESCRIPTION OF DRAWINGS

FIG. 4 is a perspective view, partially broken away, of the important part of the engine.

FIG. 11 is a side view of the manifold insulator of FIG. 10.

FIG. 12 is a schematic cross-sectional view of assistance in explaining the position relation between the manifold insulator and a turbine insulator.

FIG. 13 is a schematic side view illustrating the manifold insulator according to a modification.

DESCRIPTION OF EMBODIMENTS

[Overall Configuration of Engine]

Figure 1:
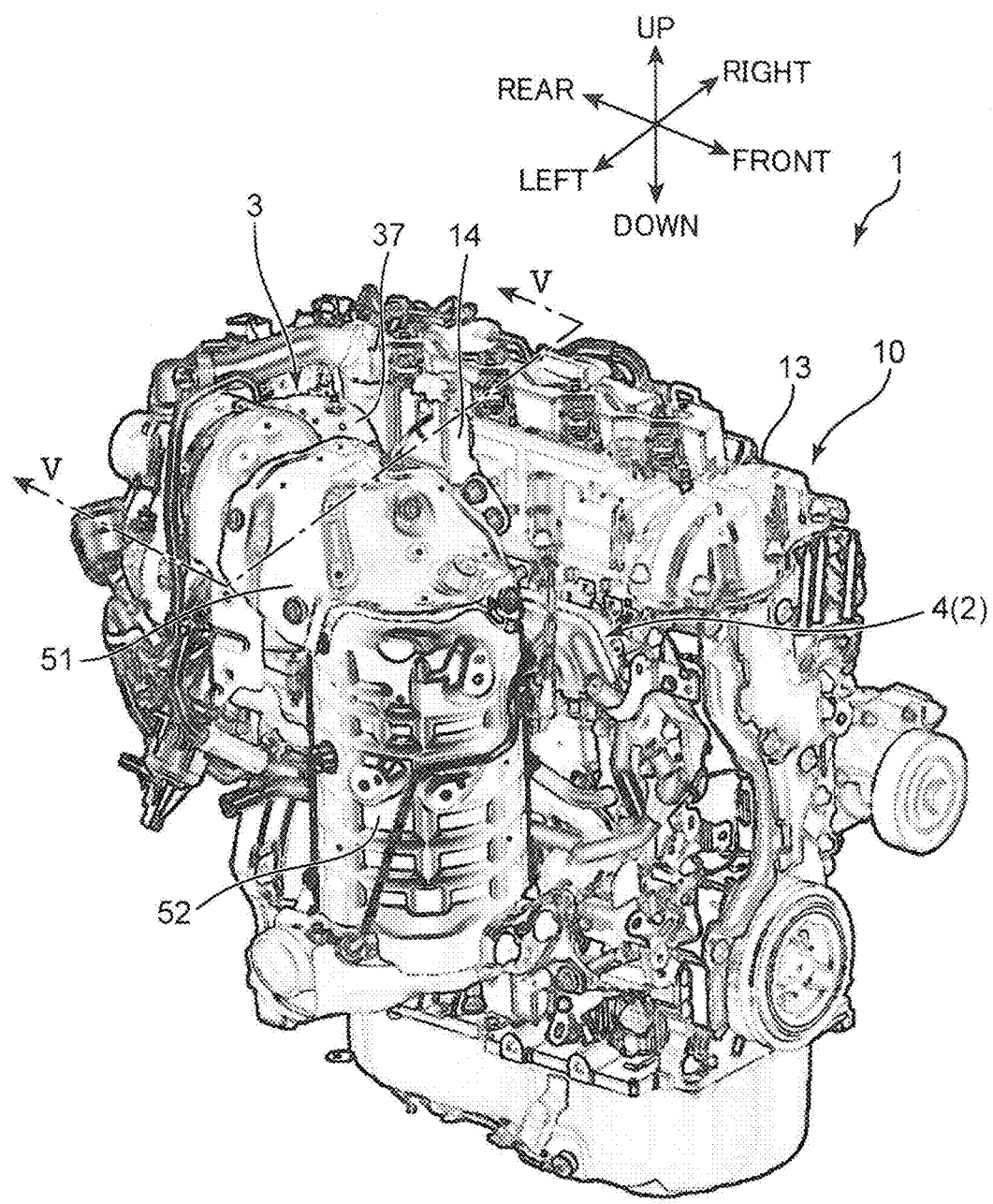
FIG. 1 is a perspective view of an engine equipped with a turbo supercharger according to an embodiment of the present invention.
Figure 2:
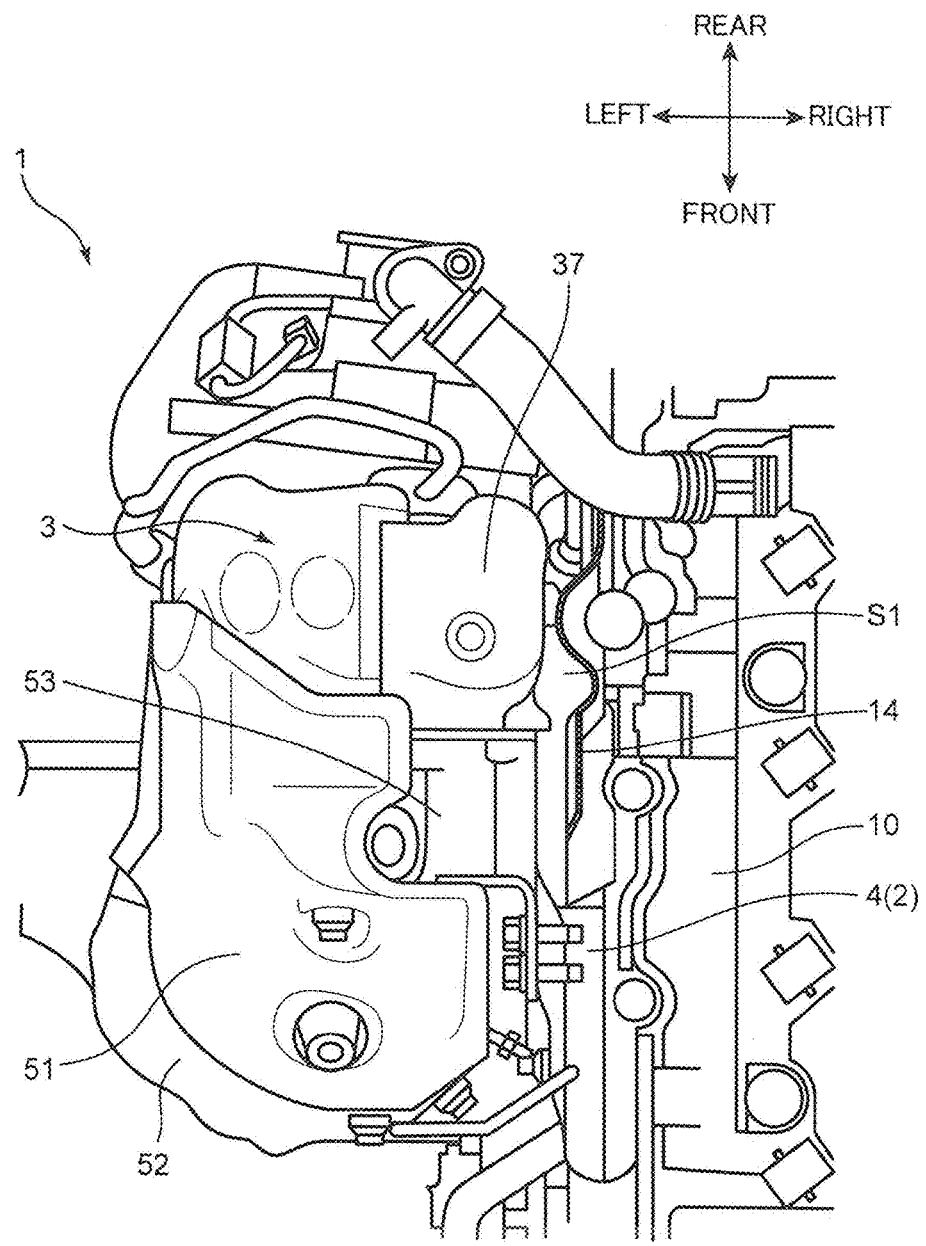
FIG. 2 is a top view of the engine illustrated in FIG. 1.
Figure 3:
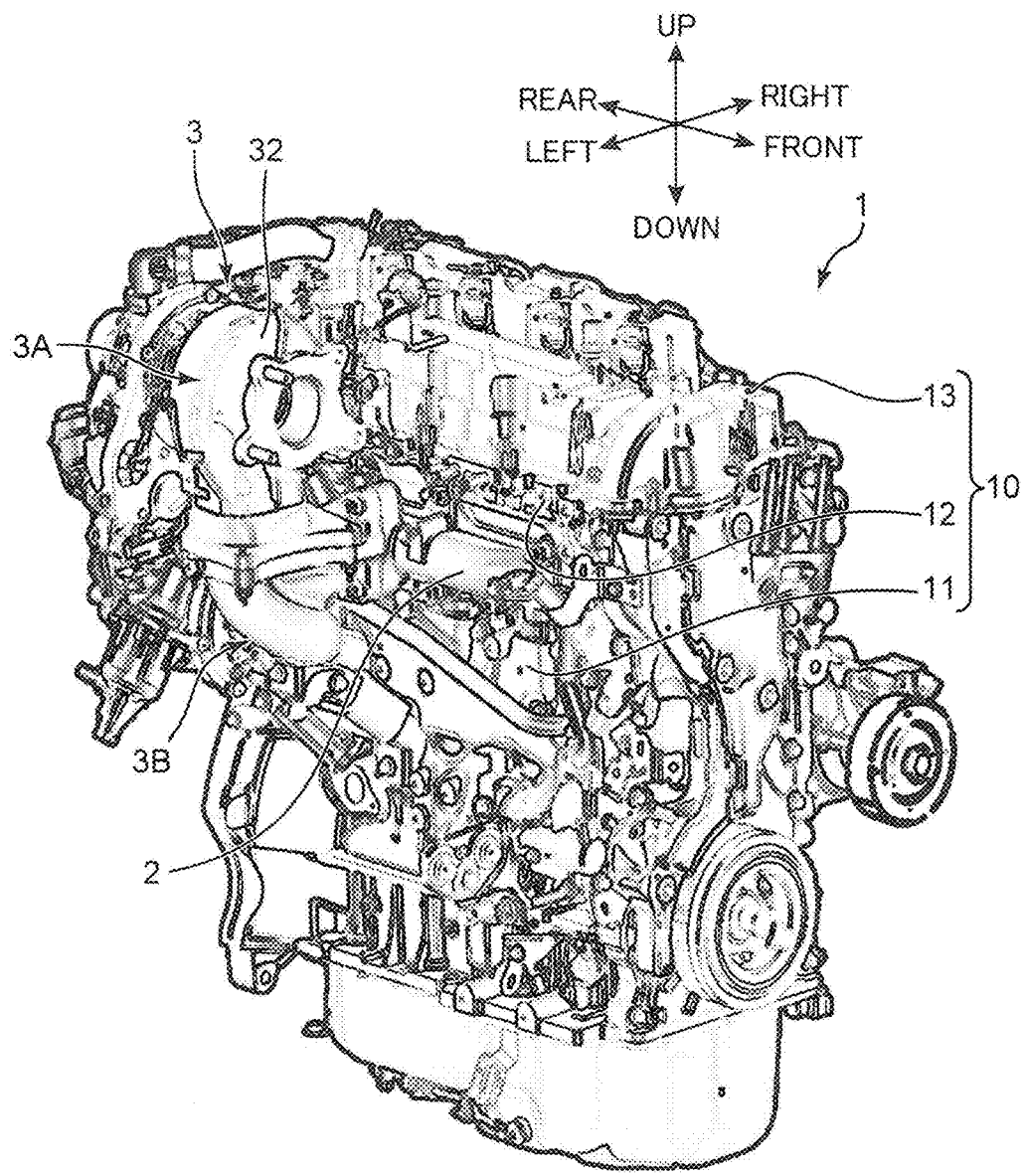
FIG. 3 is a perspective view of a state where an exhaust gas purification device and heat insulators are removed from the engine illustrated in FIG. 1.
Figure 5:
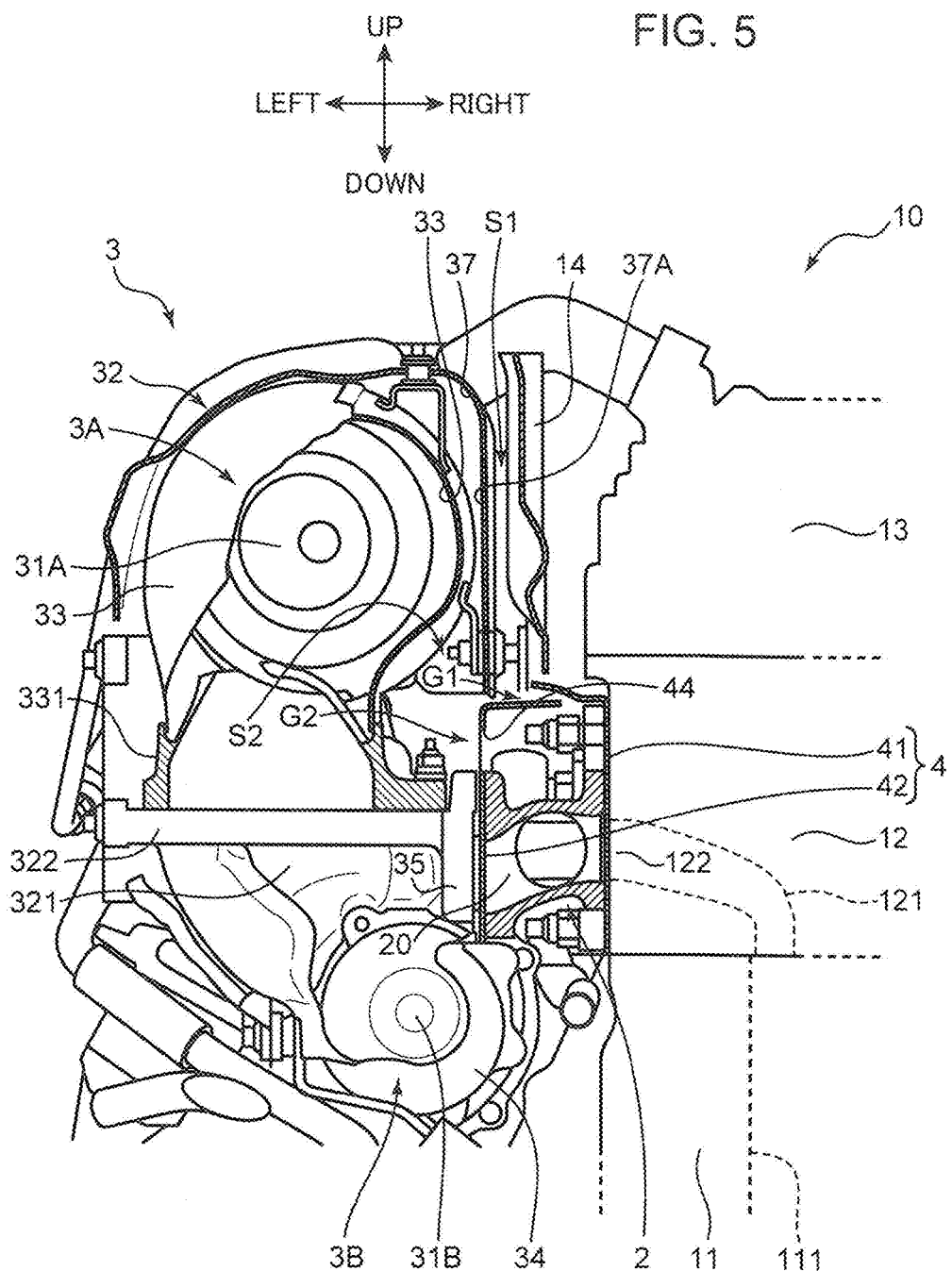
FIG. 5 is a cross-sectional view taken along line V-V of FIG. 1.

An engine equipped with a turbo supercharger according to an embodiment of the present invention will be described below in detail with reference to the drawings. First, the overall configuration of the engine will be described. FIG. 1 is a perspective view of an engine equipped with a turbo supercharger 1 according to the embodiment of the present invention, FIG. 2 is a top view of the engine 1, and FIG. 3 is a perspective view of a state where an exhaust gas purification device and various heat insulators are removed from the engine 1. In addition, FIG. 4 is a perspective view, partially broken away, of the important part of the engine 1. FIG. 5 is a cross-sectional view taken along line V-V of FIG. 1. It is to be noted that in FIG. 5, an engine body 10 is simply illustrated. In FIGS. 1 to 5 and other drawings, the indication of front, rear, left, right, up, and down directions is given. This is for the sake of convenience of the description, and does not always indicate the actual directions.

The engine equipped with a turbo supercharger 1 includes a multi-cylinder engine body 10, an exhaust manifold 2 coupled to the left side surface of the engine body 10, a turbo supercharger 3 disposed on the left side of the engine body 10, and a manifold insulator 4 covering the periphery of the exhaust manifold 2.

The engine body 10 is an in-line four-cylinder engine, and has a cylinder block 11, a cylinder head 12 mounted on the upper surface of the cylinder block 11, and a cylinder head cover 13 disposed on the upper side of the cylinder head 12. The cylinder block 11 has four cylinder bores 111 that each bore defines a combustion chamber for each cylinder (one of them is illustrated in FIG. 5). The aligning direction of the cylinder bores 111 is the front-rear direction. That is, in this embodiment, the cylinder aligning direction is the front-rear direction.

The cylinder head 12 has a plurality of intake ports (not illustrated) that each port communicates with the upper end of each of the cylinder bores 111 via an intake valve, and a plurality of exhaust ports 121 (FIG. 5) that each port communicates with the upper end of each of the cylinder bores 111 via an exhaust valve. To the mounting openings of the intake ports, an intake manifold (not illustrated) is coupled. On the other hand, to mounting openings 122 of the exhaust ports 121, the exhaust manifold 2 is coupled. The cylinder head cover 13 is a cover made of a resin, and is mounted on the upper surface of the cylinder head 12 so as to cover a valve gear equipped in the cylinder head 12.

On the left side surface of the engine body 10 and in the position opposite the turbo supercharger 3, an engine body insulator 14 is disposed. The engine body insulator 14 is a heat shield plate including a draw-processed product of an aluminum-plated steel plate or a laminated plate including the steel plate (this is ditto for other insulators described below). The engine body insulator 14 is a substantially plate-shaped insulator adjacent to the left side of the cylinder head cover 13 and extending in the up-down direction. The engine body insulator 14 protects the cylinder head cover 13, a harness, and sensors from heat emitted from the exhaust manifold 2 and the turbo supercharger 3 through which hot exhaust gas discharged exclusively from the engine body 10 circulates.

The exhaust manifold 2 has an exhaust passage 20 (FIG. 5) in the interior of the exhaust manifold 2, the exhaust passage 20 collecting exhaust gases discharged from the exhaust ports 121 of the respective cylinders to one flow passage. As described above, the intake side of the exhaust manifold 2 is coupled to the cylinder head 12, and the exhaust side of the exhaust manifold 2 is connected to the turbo supercharger 3. In this embodiment, the exhaust manifold 2 is a member in which the front-rear direction that is the cylinder aligning direction is the longitudinal direction.

The manifold insulator 4 is an insulator performing heat insulation so that peripheral components do not suffer thermal damage due to heat emitted from the exhaust manifold 2. In this embodiment, the manifold insulator 4 covers the left and right side surfaces and the upper surface of the exhaust manifold 2. It is to be noted that the manifold insulator 4 covers at least the upper surface of the exhaust manifold 2 and the side surface of the exhaust manifold 2 on the turbo supercharger 3 side (left side surface). In addition, the manifold insulator 4 has a first opening G1 and a second opening G2 for actively releasing hot air in the insulator 4 to the outside. The exhaust manifold 2 and the manifold insulator 4 will be described later in detail with reference to FIG. 6 and afterward.

The turbo supercharger 3 is a device that supercharges intake air in the engine body 10 by using an exhaust energy discharged from the engine body 10. The turbo supercharger 3 has a large turbo 3A that is operated from the low speed range or the medium speed range to the high speed range to supercharge intake air, and a small turbo 3B that is operated only in the low speed range to supercharge intake air. In this embodiment, the small turbo 3B is joined to the lower side of the large turbo 3A. Each of the large turbo 3A and the small turbo 3B has a turbine chamber disposed on the front side, and a compressor chamber disposed on the rear side. In the turbine chamber, a turbine wheel is disposed, and in the compressor chamber, a blower impeller is disposed. The turbine wheel and the blower impeller are coupled by a shaft member, and integrally rotate about the axis of the shaft member.

In FIG. 5, a large turbine chamber 31A of the large turbo 3A and a small turbine chamber 31B of the small turbo 3B are illustrated. The large turbine chamber 31A is a turbine chamber disposed above the exhaust manifold 2. On the other hand, the small turbine chamber 31B is disposed slightly below the exhaust manifold 2. To the large turbine chamber 31A and the small turbine chamber 31B, exhaust gas is supplied from the exhaust manifold 2.

The turbo supercharger 3 has a turbine housing 32 demarcating the large turbine chamber 31A and a small turbine chamber 31 and a gas passage that is the passage of exhaust gas (the supply path of exhaust air). The turbine housing 32 includes a turbine head 321, a large turbo housing 33, and a small turbo housing 34. The turbine head 321 has, in the interior of the turbine head 321, a gas passage that guides exhaust gas supplied from the exhaust manifold 2 into the large turbine chamber 31A and the small turbine chamber 31B.

The large turbo housing 33 is a member demarcating the space of the large turbine chamber 31A. At the lower end of the large turbo housing 33, a housing base 331 having a flange shape is mounted. The small turbo housing 34 is a member demarcating the space of the small turbine chamber 31B, and is molded integrally with the turbine head 321. At the upper end of the turbine head 321, a support flange 322 is disposed. The housing base 331 is placed on the support flange 322, and both are bolt fastened.

The periphery of the turbine housing 32 is covered by a turbine insulator 37. In the upper portion of the turbo supercharger 3 in which the large turbo 3A is disposed, the large turbo housing 33 demarcates the space of a turbine scroll section and the space accommodating the turbine wheel, and the turbine insulator 37 covers the periphery of the large turbo housing 33 with being spaced from the outer peripheral surface of the large turbo housing 33. The turbine insulator 37 has an opposite wall 37A on the side opposite the engine body 10 (cylinder head cover 13), the opposite wall 37A extending in a plate shape in the up-down direction. The lower end of the opposite wall 37A extends to the vicinity of the upper surface of the manifold insulator 4.

The turbine insulator 37 and the cylinder head cover 13 are adjacent at substantially the same height position in the left-right direction (lateral direction) through a space. On the side surface of the cylinder head cover 13 opposite the opposite wall 37A of the turbine insulator 37, the engine body insulator 14 is disposed. For this, the opposite wall 37A and the engine body insulator 14 that are both in a plate shape are opposite in the left-right direction across a space. This space is a belt-shaped space that extends in the up-down direction (front-rear direction) above the exhaust manifold 2, and in this embodiment, the space is called a manifold upward space S1.

The large turbo housing 33 has a tubular outer shape along the shape of the large turbine chamber 31A in a substantially tubular shape. On the other hand, the opposite wall 37A is a member in a plate shape. The opposite wall 37A is disposed so as to have a predetermined interval in the left-right direction with respect to the portion of the large turbo housing 33 protruding to the rightmost side. In this embodiment, the space between the large turbo housing 33 and the turbine insulator 37 (opposite wall 37A) is called a supercharger internal space S2 (space).

The turbo supercharger 3 has a turbine side flange 35 and an exhaust device side flange 36 (FIG. 4). The turbine side flange 35 is a flange that is disposed on the intake side of the turbine head 321 and is connected to the exhaust side of the exhaust manifold 2. The manifold upward space S1 extends upward so that the disposing position of the turbine side flange 35 is substantially the center in the front-rear direction. The exhaust device side flange 36 is a flange that is connected to the downstream side piping of an exhaust path.

On the downstream side piping of the exhaust path, the exhaust gas purification device is mounted. The exhaust gas purification device is a catalytic device that removes harmful substances contained in exhaust gas. The disposing position of the exhaust gas purification device is on the left side of the engine body 10 and on the front side of the turbo supercharger 3. In FIGS. 1 and 2, for heat insulation, a CATA upper insulator 51 that covers the upper surface of the exhaust gas purification device and a CATA lateral insulator 52 that covers the side surface of the exhaust gas purification device are illustrated.

The CATA upper insulator 51 and the turbine insulator 37 are assembled so that the rear end portion of the CATA upper insulator 51 overlaps with the upper side of the front end portion of the turbine insulator 37. However, both of the insulators 37 and 51 do not completely cover the upper surface of the assembly of the turbine housing 32 and the exhaust gas purification device, and in the position toward the engine body 10, an upper surface opening 53 is disposed.

[Detail of Hot Air Releasing Configuration]

As described above, the manifold insulator 4 covers the periphery of the exhaust manifold 2 to prevent thermal damage to the peripheral components. However, even when the manifold insulator 4 covers the exhaust manifold 2, hot air cannot be completely confined in the manifold insulator 4, and it is expected that the hot air leaks out from an unexpected gap to cause thermal damage to the peripheral components. Accordingly, the manifold insulator 4 of this embodiment has, as openings for releasing the hot air, the first opening G1 and the second opening G2. The first opening G1 is opened toward the manifold upward space S1, the second opening G2 is opened toward the supercharger internal space S2, and into the spaces S1 and S2, the hot air in the manifold insulator 4 is actively released. The hot air releasing configuration will be described below in detail with reference to FIGS. 6 to 11.

Figure 6:
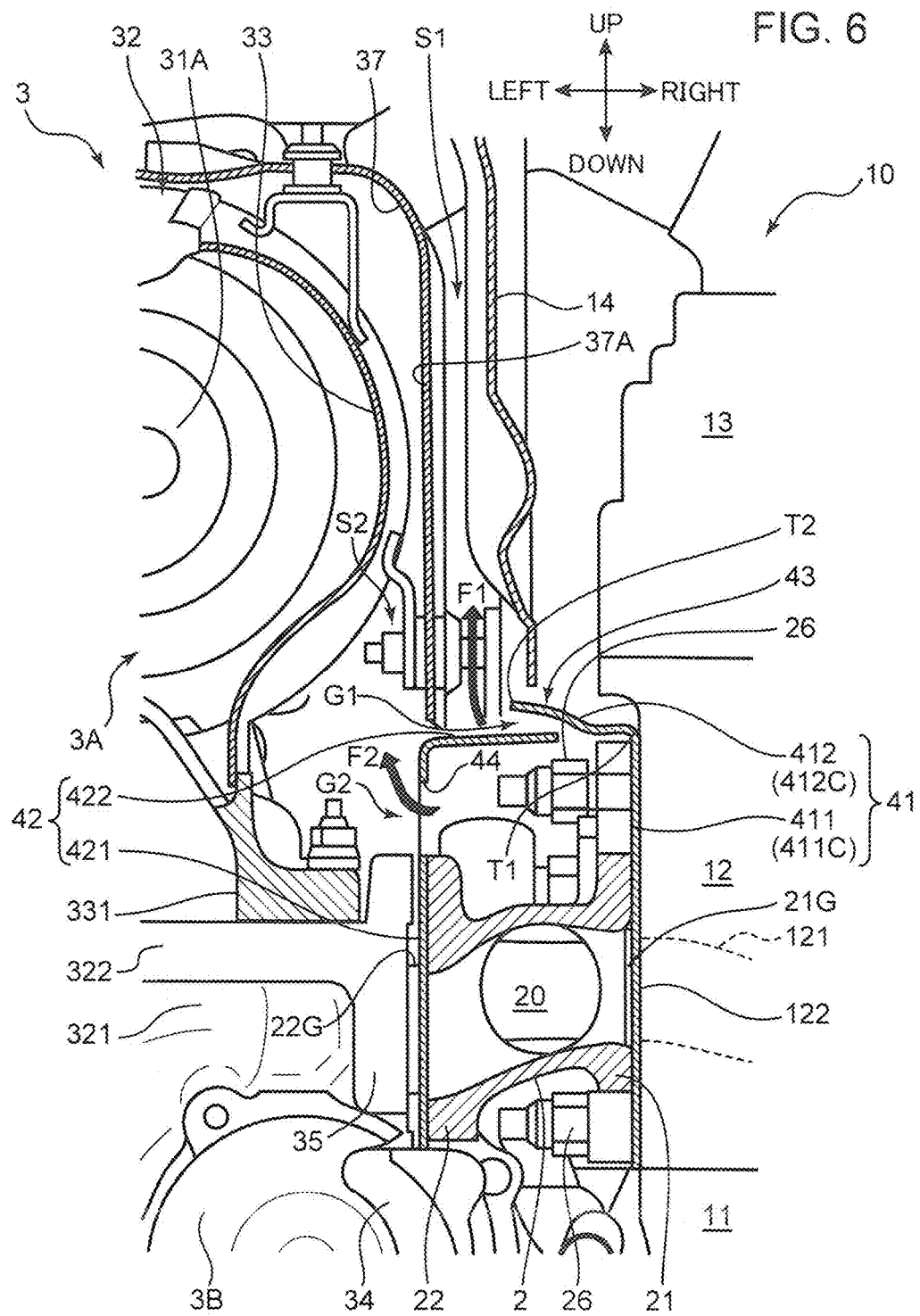
FIG. 6 is an enlarged cross-sectional view of the important part of FIG. 5.
Figure 7:
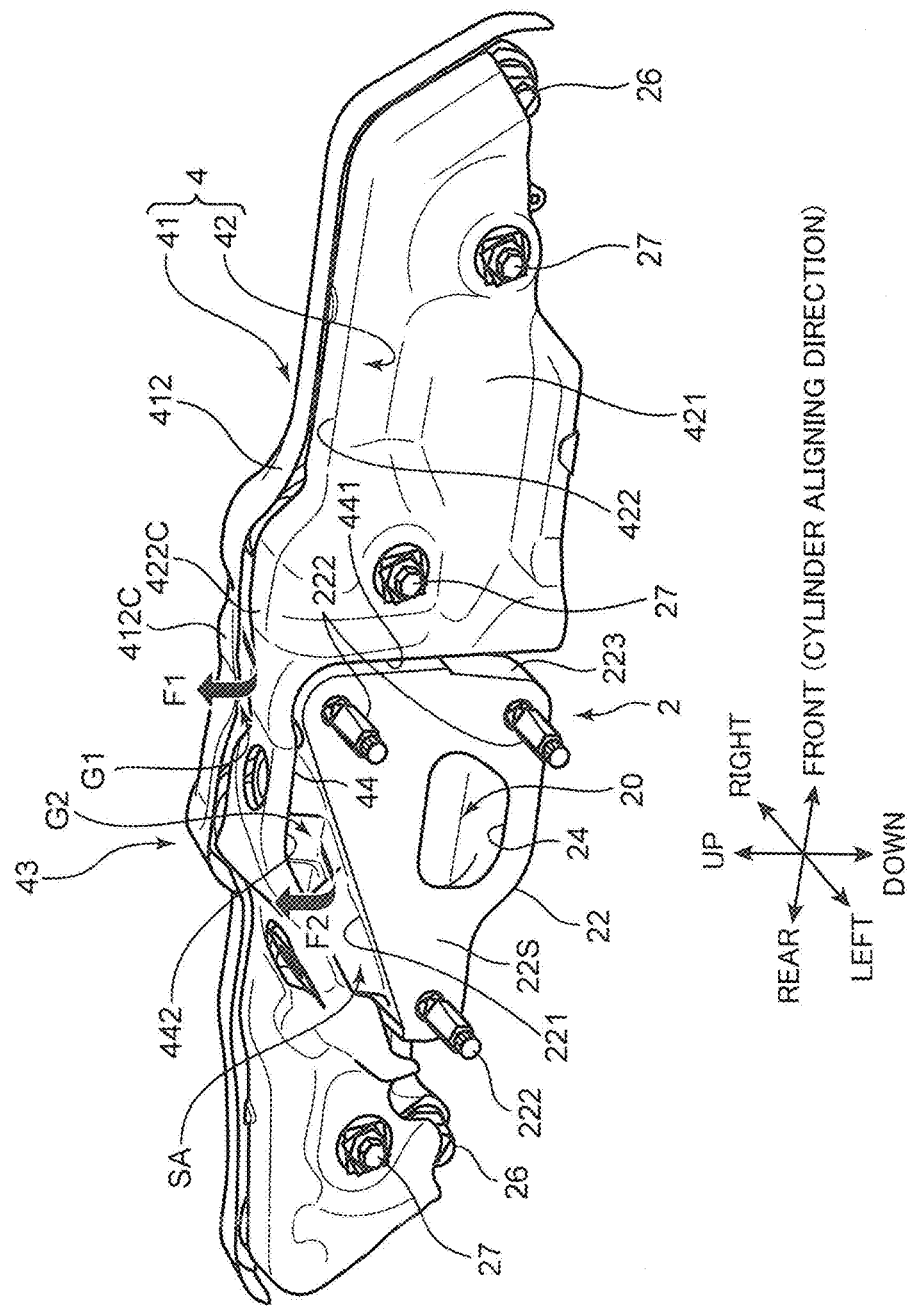
FIG. 7 is a perspective view of an exhaust manifold on which a manifold insulator (heat insulator) is disposed.

FIG. 6 is an enlarged cross-sectional view of the important part of FIG. 5. FIG. 7 is a perspective view of the exhaust manifold 2 on which the manifold insulator 4 is disposed. In this embodiment, an example in which the manifold insulator 4 is configured of the assembly of two division pieces is illustrated. The manifold insulator 4 includes the assembly of a first insulator piece 41 disposed on the engine body 10 side and a second insulator piece 42 disposed on the turbo supercharger 3 side.

Figure 8:
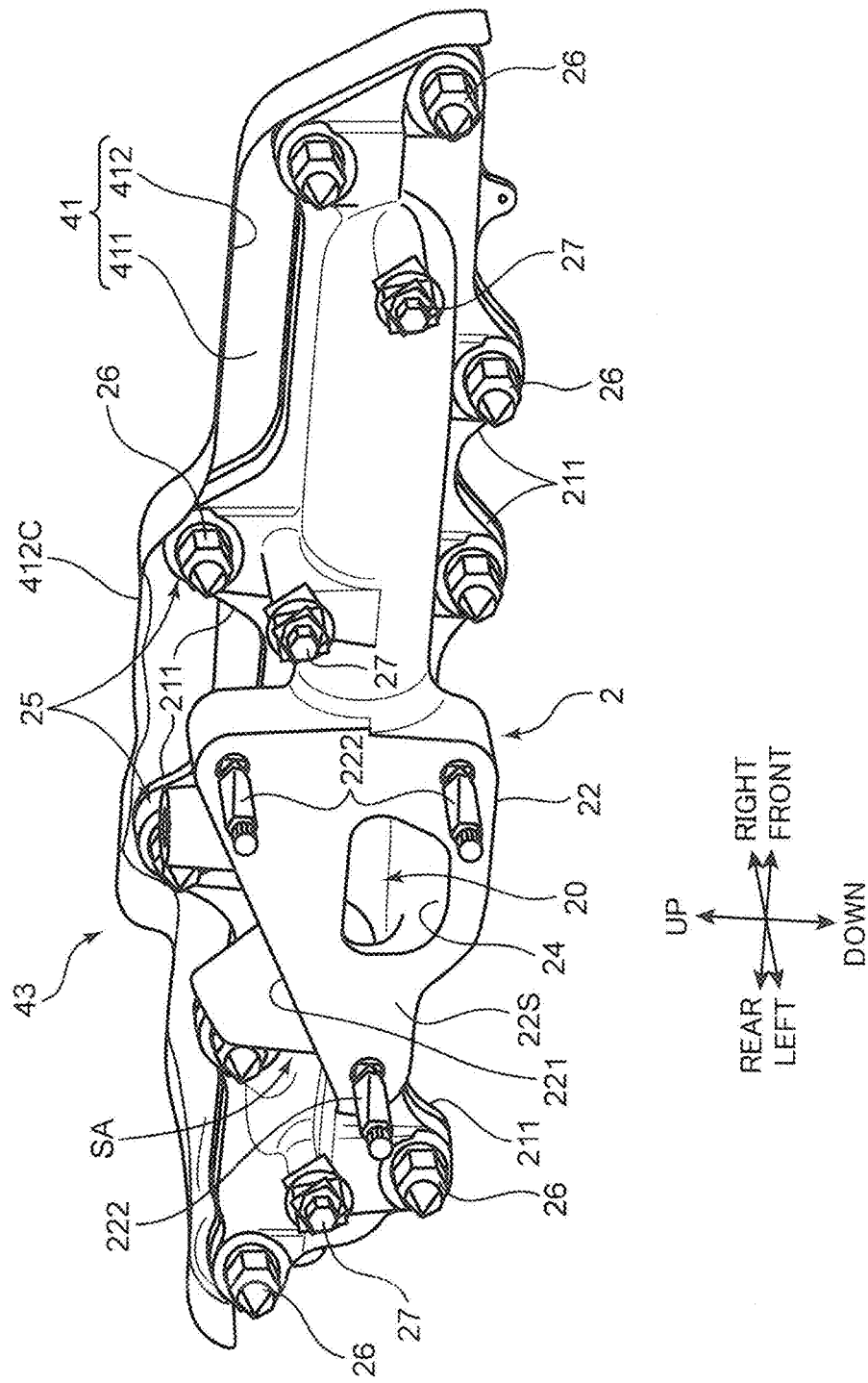
FIG. 8 is a perspective view of the exhaust manifold in a state where an insulator on the turbo supercharger side is removed.
Figure 9:
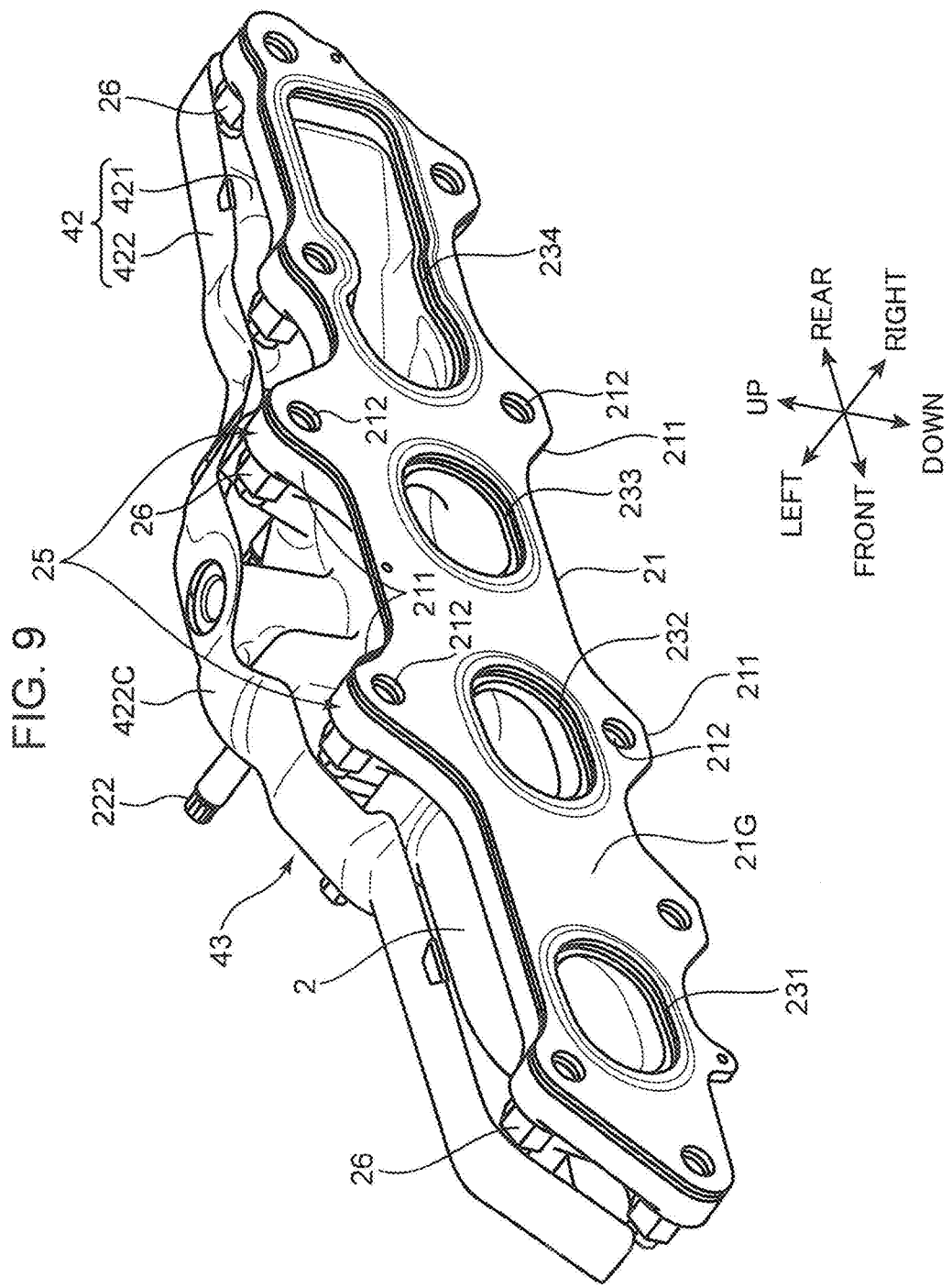
FIG. 9 is a perspective view of the exhaust manifold in a state where an insulator on the engine body side is removed.
Figure 10:
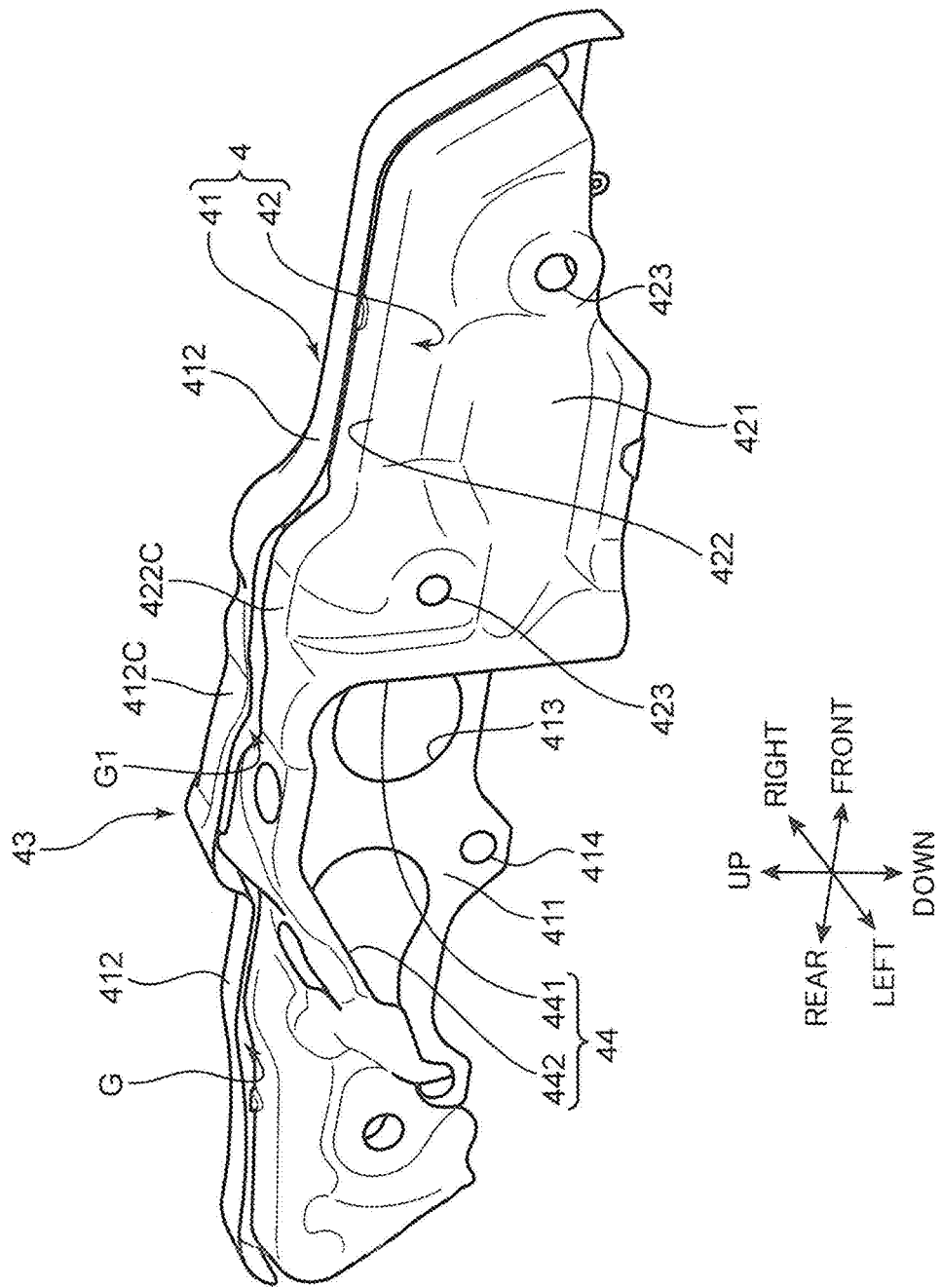
FIG. 10 is a perspective view of the assembly of the manifold insulator.

FIG. 8 is a perspective view of the exhaust manifold 2 in a state where the second insulator piece 42 is removed, and FIG. 9 is a perspective view of the exhaust manifold 2 in a state where the first insulator piece 41 is removed. FIG. 10 is a perspective view of the assembly of the first insulator piece 41 and the second insulator piece 42 (manifold insulator 4), and FIG. 11 is a side view of the assembly illustrated in FIG. 10.

<Exhaust Manifold>

The exhaust manifold 2 has an intake side flange 21 (see FIG. 9) on the engine body 10 side of the main body in which the exhaust passage 20 of a manifold type is formed, and an exhaust side flange 22 (see FIG. 8) on the turbo supercharger 3 side of the main body. The intake side flange 21 is connected to the cylinder head 12, and the exhaust side flange 22 is connected to the turbine head 321. The exhaust manifold 2 guides exhaust gas discharged from the exhaust ports 121 into the large turbine chamber 31A and the small turbine chamber 31B of the turbo supercharger 3.

In the intake side flange 21, four intake openings 231, 232, 233, and 234 that are the manifold opening ends of the exhaust passage 20 are disposed so as to be aligned in the front-rear direction. For this, the intake side flange 21 has a long shape in the front-rear direction. The intake openings 231 to 234 are aligned corresponding to the mounting openings 122 of the exhaust ports 121 of the respective cylinders. At the outer peripheral edge of the intake side flange 21, a plurality of bulging sections 211 are protruded. In each of the bulging sections 211, a through hole 212 is bored. It is to be noted that two bulging sections 211 that are disposed near the center in the front-rear direction of the intake side flange 21 protrude largely especially upward, and thus become high upper surfaces 25 in which the height of the upper surface of the exhaust manifold 2 is higher near the center than in other portions.

In the exhaust side flange 22 (flange), one exhaust opening 24 that is the communication opening of the exhaust path with respect to the turbo supercharger 3 is disposed. The exhaust side flange 22 has a substantially right triangular shape in side view from the left side, and on the upper surface of the exhaust side flange 22, an oblique side 221 that lowers from the front end toward the rear end of the exhaust side flange 22 is disposed. In other words, when it is assumed that the exhaust side flange 22 is formed in a rectangular shape, the exhaust side flange 22 has, on the upper side of the flange 22, a small area section SA in which part of the outer peripheral edge of the flange 22 is removed in a triangular shape in the down direction of the flange 22. Near each of three corners of the right triangular shape of the exhaust side flange 22, a flange stud 222 is protruded leftward. It is to be noted that the high upper surfaces 25 and the exhaust side flange 22 are in the position relation in which the high upper surfaces 25 and the exhaust side flange 22 face each other in the left-right direction. That is, the high upper surfaces 25 are located near the connection section with respect to the turbo supercharger 3.

The intake side flange 21 is butt-joined to the cylinder head 12 in a state where the mounting openings 122 of the respective exhaust ports 121 and the intake openings 231 to 234 are aligned. In this joining, each of fastening bolts 26 is threaded into each of the screw holes of the cylinder head 12 through each of the through holes 212, so that the exhaust manifold 2 is fastened and fixed to the cylinder head 12.

Between the end surface (right surface) of the intake side flange 21 and the aligning surface of the mounting openings 122 of the cylinder head 12, an intake side gasket 21G is interposed. The intake side gasket 21G is a stacking metal gasket, and seals exhaust gas in the connection section. In FIG. 9, the right surface of the intake side gasket 21G is exposed.

It is to be noted that in this embodiment, an example in which the first insulator piece 41 of the manifold insulator 4 is integrated with the intake side gasket 21G is illustrated. The first insulator piece 41 configures the layer on the rightmost side of the intake side gasket 21G including the stacking metal gasket (of course, the layer may be on any side other than the rightmost side), and FIG. 9 illustrates a state where the surface of the intake side gasket 21G is exposed when the first insulator piece 41 is removed.

The exhaust side flange 22 is butt-joined to the turbine side flange 35 disposed on the inlet side of the turbine head 321. In this joining, the flange studs 222 pass through holes bored in the turbine side flange 35, and both of the flanges 22 and 35 are fixed by bolt fastening (see FIG. 4). Between a joining surface 22S (left surface) of the exhaust side flange 22 and the turbine side flange 35, an exhaust side gasket 22G is interposed. The exhaust side gasket 22G is also a stacking metal gasket. It is to be noted that the second insulator piece 42 is not interposed between both of the flanges 22 and 35, and the joining surface 22S of the exhaust side flange 22 is exposed (see FIG. 7).

<Manifold Insulator>

The manifold insulator 4 has a long shape in the front-rear direction corresponding to the shape of the exhaust manifold 2. In addition, since the exhaust manifold 2 has the high upper surfaces 25 near the center in the front-rear direction, the manifold insulator 4 also has, near the center in the front-rear direction of the manifold insulator 4, a protrusion 43 that protrudes upward so as to cover the high upper surfaces 25. It is to be noted that in this embodiment, an example in which there is not a wall serving as an insulator on the bottom surface of the manifold insulator 4, is illustrated, but the wall may be disposed on the bottom surface of the manifold insulator 4.

As already described, the manifold insulator 4 includes the assembly of the first insulator piece 41 and the second insulator piece 42. The first insulator piece 41 disposed on the engine body 10 side includes a first erecting wall 411 and a first upper wall 412, and has an inverted L shape in a cross section orthogonal to the cylinder aligning direction (FIGS. 5 and 6). The first erecting wall 411 is a wall that extends in the up-down direction along the left side surface of the engine body 10 (cylinder head 12). The first upper wall 412 is a wall that extends in the left lateral direction from the upper end of the first erecting wall 411 upward of the exhaust manifold 2.

The second insulator piece 42 disposed on the turbo supercharger 3 side includes a second erecting wall 421 (erecting wall) and a second upper wall 422 (upper wall), and like the first insulator piece 41, has an inverted L shape in the cross section orthogonal to the cylinder aligning direction. The second erecting wall 421 is a wall that extends in the up-down direction along the side surface of the turbo supercharger 3. The second upper wall 422 is a wall that extends in the right lateral direction from the upper end of the second erecting wall 421 upward of the exhaust manifold 2. That is, the second insulator piece 42 covers the upper surface of the exhaust manifold 2 and the side surface of the exhaust manifold 2 on the turbo supercharger 3 side.

The first insulator piece 41 and the second insulator piece 42 are assembled so that the first erecting wall 411 and the second erecting wall 421 are opposite each other and that the first upper wall 412 and the second upper wall 422 overlap in part in the up-down direction. In this embodiment, the first insulator piece 41 and the second insulator piece 42 are assembled so that part of the first upper wall 412 covers the upper side of the second upper wall 422.

In the first erecting wall 411 of the first insulator piece 41, a plurality of windows 413 and a plurality of bolt holes 414 are bored. The windows 413 are openings that are passing openings for exhaust gas, and are openings that are aligned with the intake openings 231 to 234 of the exhaust manifold 2. The bolt holes 414 are holes that are aligned with the through holes 212 through which the fastening bolts 26 are inserted. The first erecting wall 411 (first insulator piece 41) is fastened and fixed to the cylinder head 12 by the fastening bolts 26.

It is to be noted that the first erecting wall 411 is also a member that configures the rightmost layer of the intake side gasket 21G, and is mounted on the right surface of the intake side gasket 21G illustrated in FIG. 9. In other words, the first insulator piece 41 is a member in which to the upper end of one of stacking metal plates of the intake side gasket 21G, an extension section (upper wall) that extends out in the lateral direction is joined. Therefore, the first insulator piece 41 is integrated with the intake side gasket 21G, and is fastened and fixed to the cylinder head 12 in a state of being interposed between the intake side flange 21 and the flanges of the exhaust ports 121 of the cylinder head 12.

In the second erecting wall 421 of the second insulator piece 42, a plurality of bolt insertion holes 423 are bored (FIG. 10). The bolt insertion holes 423 are bored corresponding to bosses having screw holes disposed on the left surface side of the exhaust manifold 2. The second erecting wall 421 (second insulator piece 42) is fastened and fixed to the exhaust manifold 2 by fastening bolts 27 threaded into the bosses through the bolt insertion holes 423. It is to be noted that a fixing section by the fastening bolts 27 is desired to employ a floating configuration for preventing the vibration of the second insulator piece 42.

When the first insulator piece 41 and the second insulator piece 42 are brought into contact with each other for assembling, abnormal sound can be caused by vibration at the time of driving the vehicle. For this, between the first upper wall 412 and the second upper wall 422 that overlap in the up-down direction, a gap G that is a predetermined interval is secured (see FIG. 10). In this embodiment, the gap G is wider in the position of the protrusion 43 present near the center in the front-rear direction of the manifold insulator 4 than in other positions. The portion in which the gap G is made wider is a first opening G1 that releases hot air in the manifold insulator 4.

In detail, the first upper wall 412 has a center portion 412C that is bulged upward near the center in the front-rear direction, and likewise, the second upper wall 422 has a center portion 422C that is bulged upward near the center in the front-rear direction. In the portion in which the center portions 412C and 422C overlap, the gap G between both is relatively wider than the gap G in other portions, so that the first opening G1 that can actively release hot air is formed. The first opening G1 is located upward of the exhaust side flange 22 that is the connection section of the exhaust manifold 2 and the turbo supercharger 3.

Referring to FIG. 6, the first erecting wall 411 is disposed so as to be joined to the lower side of the engine body insulator 14. In this embodiment, from the position shifted slightly rightward from the lower end of the engine body insulator 14, the first erecting wall 411 extends downward. The first upper wall 412 has a base end T1 joined to the first erecting wall 411, and an end edge T2 that is an end in the extension direction (left end). The end edge T2 demarcates part of the first opening G1. The direction in which the first upper wall 412 extends is the direction toward the turbine insulator 37. The first upper wall 412 inclines upward so that the end edge T2 is higher than the base end T1. With this, the interval between the first upper wall 412 and the second upper wall 422 is widened. The first opening G1 is opened so as to direct toward the space between the turbine insulator 37 and the engine body insulator 14, that is, toward the manifold upward space S1.

As illustrated in FIG. 7, the second opening G2 is disposed in the second erecting wall 421 of the second insulator piece 42. In the second erecting wall 421, a cut-away section 44 exposing the joining surface 22S of the exhaust side flange 22 is disposed. The cut-away section 44 has a vertical edge 441 opposite a front side 223 of the exhaust side flange 22 having a right triangular shape in side view, and an inclining edge 442 (cut-away edge) opposite the oblique side 221 on the upper side of the exhaust side flange 22 (the outer peripheral edge of the small area section SA). It is to be noted that the cut-away section 44 illustrated here is an open type cut-away section not having an edge opposite the bottom side of the exhaust side flange 22, but may be a window type cut-away section having the edge opposite the bottom side of the exhaust side flange 22.

The cut-away section 44 originally serves to expose the joining surface 22S of the exhaust side flange 22 to achieve the joining with the turbine side flange 35. For this, for the interval between the cut-away edge of the cut-away section 44 and the outer peripheral edge of the exhaust side flange 22, specifically, for the interval between the front side 223 and the vertical edge 441 and the interval between the oblique side 221 and the inclining edge 442, the interval is set to the extent that contact is not caused when traveling vibration is caused. However, in this embodiment, the interval between the oblique side 221 and the inclining edge 442 is relatively wider than the interval between other positions (the interval between the front side 223 and the vertical edge 441). That is, most of the inclining edge 442 is recessed protrusively upward so as to be spaced from the oblique side 221. With this, upward of the exhaust side flange 22 and between the oblique side 221 and the inclining edge 442, an opening along the oblique side 221 caused by having the interval between the oblique side 221 and the inclining edge 442 be relatively wider is formed. Such an opening is the second opening G2. The second opening G2 is present in the position upward of the exhaust side flange 22.

As illustrated in FIG. 6, the second opening G2 is opened toward the supercharger internal space S2 between the turbine housing 32 (large turbo housing 33) and the turbine insulator 37. The cut-away section 44 is located leftward of the opposite wall 37A of the turbine insulator 37. In other words, the second opening G2 is opened in the position entering the inside of the turbine insulator 37.

Referring to FIG. 12, the position relation will be described more. FIG. 12 is a schematic cross-sectional view of assistance in explaining the position relation between the manifold insulator 4 and the turbine insulator 37. At least part of the turbine housing 32 (large turbo housing 33) is located upward of the exhaust side flange 22 (flange). For this, the turbine insulator 37 also includes the portion located upward of the exhaust side flange 22. The opposite wall 37A of the turbine insulator 37 extends in the up-down direction. The second erecting wall 421 of the second insulator piece 42 and the opposite wall 37A are aligned in the up-down direction so that the opposite wall 37A is located upward of the second erecting wall 421. However, the second erecting wall 421 is disposed leftward of the opposite wall 37A by distance d, that is, on the side closer to the turbine housing 32 by distance d. The second upper wall 422 passes from the upper end of the second erecting wall 421 through below the opposite wall 37A, and extends out rightward. In such the second erecting wall 421, the cut-away section 44 is disposed. With this, the second opening G2 is also opened with respect to the supercharger internal space S2 in the position leftward of the opposite wall 37A by distance d.

<Flow of Hot Air>

Referring to FIG. 6, when exhaust gas generated by combustion at high temperature in the engine body 10 passes through the exhaust manifold 2, hot air is caused from the outer peripheral surface of the exhaust manifold 2. Since the upper side of the exhaust manifold 2 is covered by the assembly of the first insulator piece 41 and the second insulator piece 42, the hot air is not randomly dispersed into the periphery of the exhaust manifold 2. The hot air rises by convection in the exhaust manifold 2, but since the first opening G1 and the second opening G2 are disposed in the upper portion of the exhaust manifold 2, the hot air is released from these openings to the outside.

Hot air F1 is released from the first opening G1 toward the manifold upward space 51. Part of the first upper wall 412 covers the upper side of the second upper wall 422, and the first upper wall 412 inclines so that the end edge T2 directs upward. For this, the hot air F1 directs near the lower end of the turbine insulator 37, and then directs upward in the manifold upward space 51 that is a space excellent in heat resistance. That is, it can be said that the first upper wall 412 guides the hot air F1 so that the hot air F1 never leaks out to the cylinder head cover 13 made of a resin. It is to be noted that the hot air F1 is dispersed in all directions in the hood (not illustrated) after passing through the manifold upward space S1.

Hot air F2 is released from the second opening G2 toward the supercharger internal space S2. The cut-away section 44 is disposed in the second erecting wall 421 that faces the turbine housing 32. For this, the hot air F2 is released toward the turbine housing 32 side, and then directs upward in the supercharger internal space S2. Since as described based on FIG. 12, the second opening G2 is opened in the position entering the inside of the turbine insulator 37, the hot air F2 is reliably released into the supercharger internal space S2.

Since the supercharger internal space S2 is also a space excellent in heat resistance surrounded by the turbine housing 32 and the turbine insulator 37, the circulation of the hot air F2 does not cause thermal damage. Then, the hot air F2 abuts on the upper surface of the turbine insulator 37, and is then dispersed upward from the upper surface opening 53 (see FIG. 2) between the turbine insulator 37 and the CATA upper insulator 51.

[Operational Effects]

The engine equipped with a turbo supercharger 1 according to this embodiment, which has been described above, can provide the following operational effects. The engine 1 has the turbo supercharger 3 having the supercharger internal space S2. The manifold insulator 4 has the second opening G2 that is formed between the cut-away edge of the cut-away section 44 and the outer peripheral edge of the exhaust side flange 22 of the exhaust manifold 2. Hot air caused in the manifold insulator 4 is actively released through the second opening G2 into the supercharger internal space S2. The supercharger internal space S2 is demarcated by the members originally having excellent heat resistance, that is, by the turbine housing 32 and the turbine insulator 37. Therefore, the configuration in which the hot air is released by being guided into the space excellent in heat resistance is achieved. For this, it is possible to prevent a malfunction of causing thermal damage, for example, a malfunction in which the hot air is randomly released from the gap between the manifold insulator 4 and other members to cause thermal damage to the peripheral components.

Further, the manifold insulator 4 has the first opening G1 that is opened toward the manifold upward space S1. The manifold upward space S1 is also a space excellent in heat resistance, the space being demarcated by the engine body insulator 14 and the turbine insulator 37. In addition to the second opening G2, hot air is also actively released from the first opening G1, so that thermal damage to the peripheral components can be prevented more effectively.

The second opening G2 is disposed in the position upward of the exhaust side flange 22. The exhaust side flange 22 that is the connection section of the exhaust manifold 2 with the turbo supercharger 3 is the portion through which exhaust gases discharged from the exhaust ports 121 of the engine body 10 concentratively pass, and is thus likely to be the hottest portion. By disposing the second opening G2 corresponding to such a hot portion, hot air in the manifold insulator 4 can be effectively released by using free convection.

In addition, the exhaust side flange 22 has, on the upper side of the exhaust side flange 22, the small area section SA (oblique side 221), and the second opening G2 is formed between the outer peripheral edge of the small area section SA and the cut-away edge of the cut-away section 44 of the second insulator piece 42. Since the small area section SA is disposed on the upper side of the exhaust side flange 22, the portion having a wide interval can be easily formed between the outer peripheral edge of the exhaust side flange 22 and the cut-away section 44 of the manifold insulator 4 on the upper side of the exhaust side flange 22. Furthermore, since the second opening G2 is formed by itself in the position upward of the exhaust side flange 22, hot air in the manifold insulator 4 can be easily released.

The second insulator piece 42 of the manifold insulator 4 is fastened and fixed to the left surface of the exhaust manifold 2 by the fastening bolts 27. With this, by using the exhaust manifold 2 secured to the engine body 10, the strong fixing configuration of the manifold insulator 4 can be achieved.

Further, as illustrated in FIG. 12, the second erecting wall 421 of the second insulator piece 42 in which the second opening G2 is formed is disposed on the side closer to the turbine housing 32 with respect to the opposite wall 37A of the turbine insulator 37 by distance d. For this, the second opening G2 is opened toward the supercharger internal space S2 between the turbine housing 32 and the turbine insulator 37, so that hot air in the manifold insulator 4 can be reliably released into the supercharger internal space S2.

DESCRIPTION OF MODIFICATIONS

The embodiment of the present invention has been described above, but the present invention is not limited to this, and can take the following modifications.

FIG. 13 is a schematic side view illustrating a manifold insulator 4A according to a modification (a side view seen from the turbo supercharger 3 side). In the embodiment, the example in which the manifold insulator 4 has the protrusion 43, the first opening G1 is formed at the protrusion 43, and the second opening G2 is formed near the lower side of the protrusion 43 is illustrated. In FIG. 13, the manifold insulator 4A in which there is not a raised portion like the protrusion 43 on the upper surface of the manifold insulator 4A is illustrated. In addition, in the embodiment, the exhaust manifold 2 with the exhaust side flange 22 having the small area section SA is illustrated, but here, a rectangular exhaust side flange 22A not including the small area section SA is illustrated. At four corners of the exhaust side flange 22A, flange studs 222A are erected.

The manifold insulator 4A includes the assembly of a first insulator piece 41A and the second insulator piece 42. Both of the insulator pieces 41A and 42A have a rectangular shape in side view, and are assembled in a state where there is a slight gap therebetween. A recess 424 is disposed in the upper surface of a second upper wall 422A so that this gap is made larger in the disposing position of the exhaust side flange 22A between a first upper wall 412A and the second upper wall 422A. The forming portion of the recess 424 is the first opening G1. In addition, in a second erecting wall 421A of the second insulator piece 42A, a rectangular cut-away section 44A is disposed. The interval between the upper peripheral edge of the rectangular exhaust side flange 22A and the upper edge of the cut-away section 44A is wider than the side edges of the exhaust side flange 22A and the cut-away section 44A, so that the second opening G2 extending in a belt shape in the horizontal direction is formed. In this manner, the first opening G1 and the second opening G2 can take various forms as long as the first opening G1 and the second opening G2 are opened toward the manifold upward space S1 and the supercharger internal space S2, respectively.

Figure 14A:
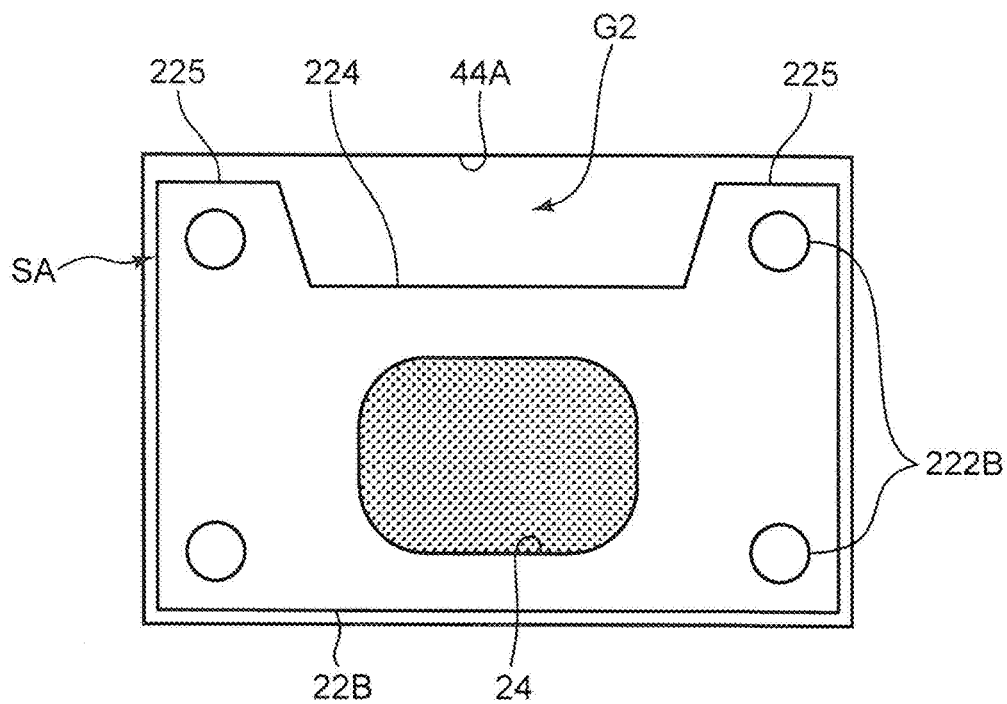
FIGS. 14A and 14B are schematic diagrams illustrating the openings of the manifold insulator according to other modifications.
Figure 14B:
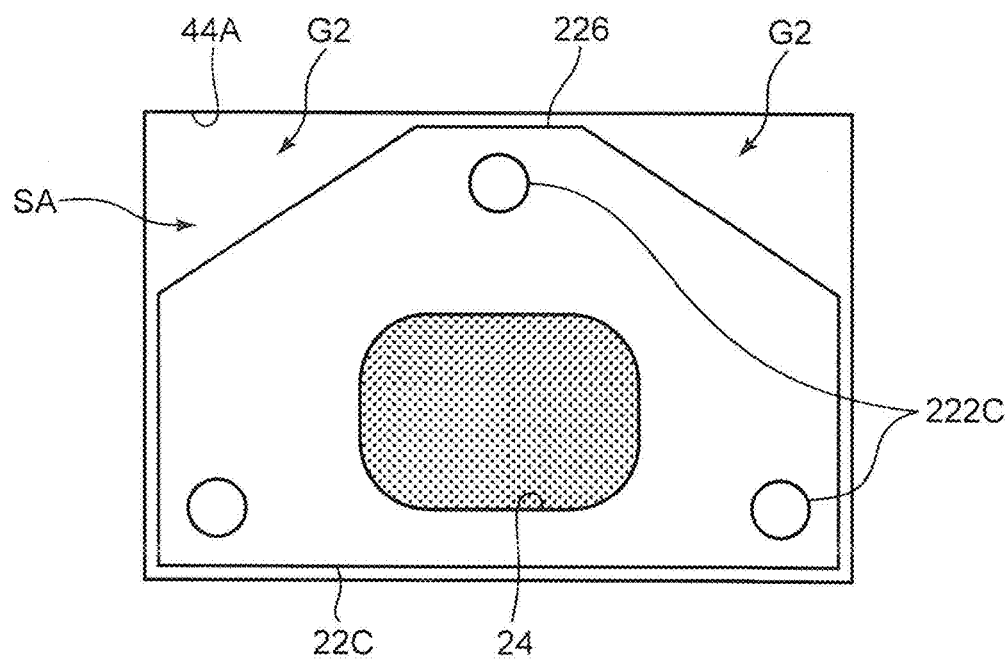

FIGS. 14A and 14B are schematic diagrams illustrating other modifications of the second opening G2. An exhaust side flange 22B of the exhaust manifold 2 illustrated in FIG. 14A has a plurality of small area sections SA on the upper side of the exhaust side flange 22B. The small area sections SA are formed by disposing a recess 224 in which the upper edge portion of the rectangular exhaust side flange 22B is removed in the down direction. On both sides of the recess 224, bulging sections 225 protruding upward are present. Flange studs 222B are erected at four corners of the exhaust side flange 22B including the bulging sections 225. The space between the upper edge of the cut-away section 44A and the recess 224 is the second opening G2.

An exhaust side flange 22C illustrated in FIG. 14B also has a plurality of small area sections SA on the upper side of the exhaust side flange 22C. The small area sections SA here are formed in such a manner that the upper portion of the exhaust side flange 22C is a protrusion 226 in a mountain shape. That is, the small area sections SA are formed by removing two upper corners of the rectangular exhaust side flange 22C into a triangular shape in the center direction of the flange 22C. Flange studs 222C are erected in three positions of the exhaust side flange 22C including the vicinity of the top of the protrusion 226. A plurality of second openings G2 are triangular opening portions that are present on both sides of the protrusion 226. As illustrated in these modifications, the small area sections SA and the second openings G2 of the exhaust side flange 22 can take various forming forms.

In addition, in the embodiment, the example in which the first opening G1 and the second opening G2 are disposed in the manifold insulator 4 is illustrated, but the first opening G1 may be omitted. For example, when there is no space for forming the manifold upward space S1 whereas the supercharger internal space S2 has a sufficient volume as the hot air releasing path in the manifold insulator 4, the first opening G1 is not disposed substantially.

Last, the characteristic configurations disclosed in the embodiment and the operational effects based on them will be summarized.

An engine equipped with a turbo supercharger according to one aspect of the present invention has a multi-cylinder engine body, an exhaust manifold coupled to the engine body, a turbo supercharger including a turbine chamber to which exhaust air is supplied from the exhaust manifold, a turbine housing demarcating the turbine chamber and the supply path of the exhaust air, and a turbine insulator covering the turbine housing, and a manifold insulator covering at least the upper surface of the exhaust manifold and the side surface of the exhaust manifold on the turbo supercharger side. The exhaust manifold has a flange having the communication opening of an exhaust path with respect to the turbo supercharger and joined to the turbine housing. The manifold insulator has a cut-away section exposing a joining surface of the flange, and an opening caused by having the interval between the cut-away edge of the cut-away section and the outer peripheral edge of the flange be relatively wider in a predetermined position than in other positions. The opening is opened toward a space between the turbine housing and the turbine insulator.

According to the engine equipped with a turbo supercharger, hot air caused in the manifold insulator is actively released into the space between the turbine housing and the turbine insulator of the turbo supercharger through the opening between the cut-away edge of the cut-away section of the manifold insulator and the outer peripheral edge of the flange. This space is demarcated by the members originally having excellent heat resistance, that is, by the turbine housing and the turbine insulator. Therefore, the configuration in which the hot air is released by being guided into the space excellent in heat resistance is achieved. With this, it is possible to prevent a malfunction in which the hot air is randomly released from the gap between the manifold insulator and other members to cause thermal damage to the peripheral components.

In the engine equipped with a turbo supercharger, desirably, the predetermined position is the position upward of the flange.

The flange that is the connection section of the exhaust manifold with the turbo supercharger is the portion through which exhaust gases discharged from the exhaust ports of the engine body concentratively pass, and is thus likely to be the hottest portion. By disposing the opening corresponding to such a hottest portion, hot air in the manifold insulator can be effectively released by using free convection.

In the engine equipped with a turbo supercharger, desirably, the flange has, on the upper side of the flange, a small area section in which part of the outer peripheral edge of the flange is removed in the center direction or the down direction of the flange, and the opening is formed between the outer peripheral edge of the small area section and the cut-away edge of the cut-away section.

According to the engine equipped with a turbo supercharger, since the small area section is disposed on the upper side of the flange, the portion having a wide interval (opening) can be easily formed between the outer peripheral edge of the flange and the cut-away section of the manifold insulator on the upper side of the flange. In addition, since the opening is formed in the position upward of the flange, hot air in the manifold insulator can be effectively released by using free convection.

In the engine equipped with a turbo supercharger, desirably, the manifold insulator is fastened and fixed to the exhaust manifold.

In the engine equipped with a turbo supercharger, by using the exhaust manifold secured to the engine body, the strong fixing configuration of the manifold insulator can be achieved.

In the engine equipped with a turbo supercharger, desirably, the manifold insulator has, in a cross section orthogonal to the multi-cylinder aligning direction, an inverted L shape having an erecting wall extending in the up-down direction along the side surface of the turbo supercharger and an upper wall extending in the lateral direction from the erecting wall toward the upper side of the exhaust manifold, the opening being disposed in the erecting wall, the turbine insulator has, on the side opposite the engine body, an opposite wall extending in the up-down direction, and the opposite wall and the erecting wall are aligned in the up-down direction so that the opposite wall is located upward of the erecting wall, and the erecting wall is disposed on the side closer to the turbine housing with respect to the opposite wall.

According to the present invention that has been described above, it is possible to provide the engine equipped with a turbo supercharger, the engine capable of releasing hot air in the insulator without causing thermal damage to the peripheral components.

The invention claimed is:

1. An engine equipped with a turbo supercharger comprising:
   a multi-cylinder engine body;
   an exhaust manifold coupled to the engine body;
   a turbo supercharger including a turbine chamber to which exhaust air is supplied from the exhaust manifold, a turbine housing demarcating the turbine chamber and a supply path of the exhaust air, and a turbine insulator covering the turbine housing; and
   a manifold insulator covering at least the upper surface of the exhaust manifold and the side surface of the exhaust manifold on the turbo supercharger side,
   wherein the exhaust manifold has a flange having a communication opening of an exhaust path with respect to the turbo supercharger and joined to the turbine housing,
   wherein the manifold insulator has a cut-away section exposing a joining surface of the flange, and an opening caused by having the interval between the cut-away edge of the cut-away section and the outer peripheral edge of the flange be relatively wider in a predetermined position than in other positions, and
   wherein the opening is opened toward a space between the turbine housing and the turbine insulator.

2. The engine according to claim 1,
   wherein the predetermined position is the position upward of the flange.

3. The engine according to claim 1,
   wherein the flange has, on the upper side of the flange, a small area section in which part of the outer peripheral edge of the flange is removed in the center direction or the down direction of the flange, and
   wherein the opening is formed between the outer peripheral edge of the small area section and the cut-away edge of the cut-away section.

4. The engine according to claim 1,
   wherein the manifold insulator is fastened and fixed to the exhaust manifold.

5. The engine according to claim 1,
   wherein the manifold insulator has, in a cross section orthogonal to the multi-cylinder aligning direction, an inverted L shape having an erecting wall extending in the up-down direction along the side surface of the turbo supercharger, and an upper wall extending in the lateral direction from the erecting wall toward the upper side of the exhaust manifold, the opening being disposed in the erecting wall, wherein the turbine insulator has, on the side opposite the engine body, an opposite wall extending in the up-down direction, and wherein the opposite wall and the erecting wall are aligned in the up-down direction so that the opposite wall is located upward of the erecting wall, and the erecting wall is disposed on the side closer to the turbine housing with respect to the opposite wall.

6. The engine according to claim 2,
wherein the manifold insulator is fastened and fixed to the exhaust manifold.

7. The engine according to claim 3,
wherein the manifold insulator is fastened and fixed to the exhaust manifold.

8. The engine according to claim 2,
wherein the manifold insulator has, in a cross section orthogonal to the multi-cylinder aligning direction, an inverted L shape having an erecting wall extending in the up-down direction along the side surface of the turbo supercharger, and an upper wall extending in the lateral direction from the erecting wall toward the upper side of the exhaust manifold, the opening being disposed in the erecting wall, wherein the turbine insulator has, on the side opposite the engine body, an opposite wall extending in the up-down direction, and wherein the opposite wall and the erecting wall are aligned in the up-down direction so that the opposite wall is located upward of the erecting wall, and the erecting wall is disposed on the side closer to the turbine housing with respect to the opposite wall.

9. The engine according to claim 3,
wherein the manifold insulator has, in a cross section orthogonal to the multi-cylinder aligning direction, an inverted L shape having an erecting wall extending in the up-down direction along the side surface of the turbo supercharger, and an upper wall extending in the lateral direction from the erecting wall toward the upper side of the exhaust manifold, the opening being disposed in the erecting wall, wherein the turbine insulator has, on the side opposite the engine body, an opposite wall extending in the up-down direction, and wherein the opposite wall and the erecting wall are aligned in the up-down direction so that the opposite wall is located upward of the erecting wall, and the erecting wall is disposed on the side closer to the turbine housing with respect to the opposite wall.

10. The engine according to claim 4,
wherein the manifold insulator has, in a cross section orthogonal to the multi-cylinder aligning direction, an inverted L shape having an erecting wall extending in the up-down direction along the side surface of the turbo supercharger, and an upper wall extending in the lateral direction from the erecting wall toward the upper side of the exhaust manifold, the opening being disposed in the erecting wall, wherein the turbine insulator has, on the side opposite the engine body, an opposite wall extending in the up-down direction, and wherein the opposite wall and the erecting wall are aligned in the up-down direction so that the opposite wall is located upward of the erecting wall, and the erecting wall is disposed on the side closer to the turbine housing with respect to the opposite wall.

11. The engine according to claim 6,
wherein the manifold insulator has, in a cross section orthogonal to the multi-cylinder aligning direction, an inverted L shape having an erecting wall extending in the up-down direction along the side surface of the turbo supercharger, and an upper wall extending in the lateral direction from the erecting wall toward the upper side of the exhaust manifold, the opening being disposed in the erecting wall, wherein the turbine insulator has, on the side opposite the engine body, an opposite wall extending in the up-down direction, and wherein the opposite wall and the erecting wall are aligned in the up-down direction so that the opposite wall is located upward of the erecting wall, and the erecting wall is disposed on the side closer to the turbine housing with respect to the opposite wall.

12. The engine according to claim 7,
wherein the manifold insulator has, in a cross section orthogonal to the multi-cylinder aligning direction, an inverted L shape having an erecting wall extending in the up-down direction along the side surface of the turbo supercharger, and an upper wall extending in the lateral direction from the erecting wall toward the upper side of the exhaust manifold, the opening being disposed in the erecting wall, wherein the turbine insulator has, on the side opposite the engine body, an opposite wall extending in the up-down direction, and wherein the opposite wall and the erecting wall are aligned in the up-down direction so that the opposite wall is located upward of the erecting wall, and the erecting wall is disposed on the side closer to the turbine housing with respect to the opposite wall.

* * * * *